(12) United States Patent
Miller et al.

(10) Patent No.: US 6,201,539 B1
(45) Date of Patent: Mar. 13, 2001

(54) METHOD AND SYSTEM FOR CUSTOMIZING A DATA PROCESSING SYSTEM GRAPHICAL USER INTERFACE

(75) Inventors: Steven M. Miller, Apex, NC (US); David R. Schwartz, Bellevue, WA (US); Rodney A. Smith, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/177,296

(22) Filed: Jan. 4, 1994

(51) Int. Cl.$^7$ ..................................................... G06F 3/14
(52) U.S. Cl. .......................................... 345/334; 345/339
(58) Field of Search ..................... 395/155, 161, 395/157, 159, 134, 135; 345/113, 118, 145

(56) References Cited

U.S. PATENT DOCUMENTS

| | | | |
|---|---|---|---|
| 4,692,858 | 9/1987 | Redford et al. | 345/333 |
| 4,819,233 | 4/1989 | Delucia et al. | 717/4 |
| 4,860,204 | 8/1989 | Gendron et al. | 717/2 |
| 4,868,765 | * 9/1989 | Diefendorff | 345/345 |
| 4,964,075 | 10/1990 | Shaver et al. | 710/67 |
| 5,005,119 | 4/1991 | Rumbaugh et al. | 709/101 |
| 5,041,992 | 8/1991 | Cunningham et al. | 345/435 |
| 5,157,763 | * 10/1992 | Peters et al. | 345/340 |
| 5,251,291 | * 10/1993 | Malcolm | 707/539 |
| 5,301,268 | * 4/1994 | Takeda | 709/329 |
| 5,404,316 | * 4/1995 | Klingler et al. | 345/328 |
| 5,404,442 | * 4/1995 | Foster et al. | 345/348 |

* cited by examiner

*Primary Examiner*—Crescelle N. dela Torre
(74) *Attorney, Agent, or Firm*—Gregory M. Doudnikoff

(57) ABSTRACT

A method and system in a data processing system for customizing a graphic user interface environment by utilizing graphic manipulation of selected graphic user interface elements in order to initiate the installation of optional functions and/or features. A graphical user interface element within a graphic user interface is displayed within a first region of a display screen. A data processing system user is then permitted to temporarily remove the graphical user interface element from that first region of the display screen by temporarily rendering that graphic user interface element transparent or by temporarily displaying that graphic user interface element within an alternate region within the display screen. Thereafter, a selected area is designated within the first region, and a user-selectable object which is representative of an optional function and/or feature is displayed at the selected area within the first region, in response to that designation. The graphical user interface element is then restored to the first region, and the user-selectable object is thereafter displayed at the selected area within the graphical user interface element, thereby enabling a user to customize the graphical user interface element by adding an object within an existing element of a graphic user interface which represents an optional function and/or feature within the graphic user interface element.

17 Claims, 6 Drawing Sheets

METHOD AND SYSTEM FOR CUSTOMIZING A DATA PROCESSING SYSTEM GRAPHICAL USER INTERFACE

BACKGROUND OF THE INVENTION

1. Technical Field:

The present invention relates in general to a method and system for modifying functions and/or features of graphic user interface elements within a data processing system and in particular to a method and system for the installation of optional functions and/or features in system-wide and application-specific graphic user interface environments. Still more particularly, the present invention relates to a method and system for modifying functions and/or features of graphic user interface environments utilizing graphic manipulation of selected graphic user interface elements to initiate the installation of optional functions and/or features.

2. Description of the Related Art:

As data processing system computer software and hardware become increasingly complex, the interface between the data processing system and a user becomes more important. Users who have difficulty remembering, understanding, and properly entering complicated computer instructions to operate relatively simple data processing system software and hardware will surely have difficulty interfacing with such data processing systems as their capabilities, and hence their complexity, increase. If the interface between a user and a data processing system is not constantly reevaluated and improved, the rate at which data processing system manufacturers produce systems with features that require a user to enter commands which are often cryptic and complex may outpace a user's ability to learn, understand, and utilize such commands.

In order to increase a data processing system user's efficiency, data processing system hardware and software manufacturers have recently provided so-called "graphical user interfaces" (GUIs). Presently, many GUIs are known to those persons skilled in the art, and each such interface provides data processing system users a more visual and intuitive means for entering data, entering commands, and viewing computational results.

While such GUIs have shortened the time required for inexperienced users to learn to operate a data processing system, and increased the efficiency of experienced data processing system users, many data processing system users desire the capability to add additional functions and/or features to such GUI environments. Such additional functions and/or features may enhance the operation of, or add new features to, a system-wide GUI environment, or a GUI environment created by a selected application program.

Norton Desktop 2.0, by Symantec Corp., of Cupertino, California, is an example of a software package that enhances the operation of Windows, a system-wide GUI, provided by Microsoft Corp., of Redmond, Wash. Norton Desktop enhances the display of system-generated directory windows by adding a user-definable "button bar," from which a user may view, edit, and otherwise manipulate selected files directly. Such a button bar is usually displayed along the bottom edge of an open directory window.

Today, system-wide customization (i.e., modification of functions and/or features) of a GUI environment in a known system may be accomplished by placing optional functions and/or features into designated directories or folders within the data processing system start-up disk. Examples of functions or features which may be added to a window in this manner include a display of a clock or timing device, or a display of the current vertical and horizontal position of a cursor. Thereafter, as the data processing system "boots" at start-up, these optional functions and/or features are loaded and incorporated into the system software, and thereafter modify the system software, to provide an optional function and/or feature. To customize a GUI environment generated by application software, a user may be required to utilize dialog boxes and/or control panels provided by the manufacturer of the application software.

Both of the above-described methods of modifying system GUI environments and application GUI environments have substantial drawbacks. In the example of modifying a system GUI environment, the optional functions and/or features which are installed at start up typically affect GUI elements system-wide, even though a user may wish to customize only particular GUI elements under certain predetermined conditions. Thus, a data processing system user desiring to bill clients for time devoted to writing a particular document, may find it useful to have a timer displayed within a word processing application, which represents the amount of time spent writing the document. That same user, however, may not wish to have a timer displayed in every application window throughout the system.

As for the example of installing optional functions and/or features in order to customize a GUI generated by a particular application program, a user is often confronted with a wide variety of control panels and/or dialog, boxes which must be manipulated in order to install a variety of custom GUI features. Since application software is often produced by different software manufacturers having different philosophies of how a GUI should "look and feel," the process of installing various optional functions and/or features to customize different application-created GUI environments may be unnecessarily complicated. Users may also desire to have a custom feature offered by one software manufacturer installed while running an application provided by another software manufacturer.

FIG. 1 illustrates one example of a known control panel 2 which may be utilized to customize an application-generated GUI. Control panel 2 utilizes two list boxes: list box 4 and list box 6. List box 4 indicates the optional functions and/or features which are available for customizing the GUI, and list box 6 indicates the optional functions and/or features already installed in the application-generated GUI. A group of pushbuttons 8 are utilized to load (i.e., install) or move (i.e., remove) optional functions and/or features. Such installation control panels may be more suited for the installation of fonts and small utility programs called "desk accessories," rather than for the installation of optional functions, which may require a user to select a location for a display associated with that particular optional function and/or feature.

Since GUI environment customization may vary from one application to another, users who have mastered the customization techniques of one application may be required to learn new techniques for customizing another application. That is, there may be little or no transfer of learning from the customization process of one application to another. Furthermore, techniques for customizing different GUI elements within the same application may also vary. Therefore, a user may be required to learn three or more different techniques for varying GUI environments; one to customize the system-wide GUI, a second to customize a first characteristic of an application-generated GUI environment, and yet a third to customize other characteristics of the same application-generated GUI environment.

Therefore it should be apparent that a need exist for a method and system for the installation of optional functions and/or features for customizing system-wide and application-specific GUI environments.

SUMMARY OF THE INVENTION

It is therefore one object of the present invention to provide an improved method and system for modifying functions and/or features of graphic user interface elements within a data processing system.

It is another object of the present invention to provide a method and system for the installation of optional functions and/or features in system-wide and application-specific graphic user interface environments.

It is yet another object of the present invention to provide a method and system for modifying functions and/or features of graphic user interface environments utilizing graphic manipulation of selected graphic user interface elements to initiate the installation of optional functions and/or features.

The foregoing objects are achieved as is now described. A method and system are disclosed in a data processing system for customizing a graphic user interface environment by utilizing graphic manipulation of selected graphic user interface elements in order to initiate the installation of optional functions and/or features. A graphical user interface element within a graphic user interface is displayed within a first region of a display screen. A data processing system user is then permitted to temporarily remove the graphical user interface element from that first region of the display screen by temporarily rendering that graphic user interface element transparent or by temporarily displaying that graphic user interface element within an alternate region within the display screen. Thereafter, a selected area is designated within the first region, and a user-selectable object which is representative of an optional function and/or feature is displayed at the selected area within the first region, in response to that designation. The graphical user interface element is then restored to the first region, and the user-selectable object is thereafter displayed at the selected area within the graphical user interface element, thereby enabling a user to customize the graphical user interface element by adding an object within an existing element of a graphic user interface which represents an optional function and/or feature within the graphic user interface element.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
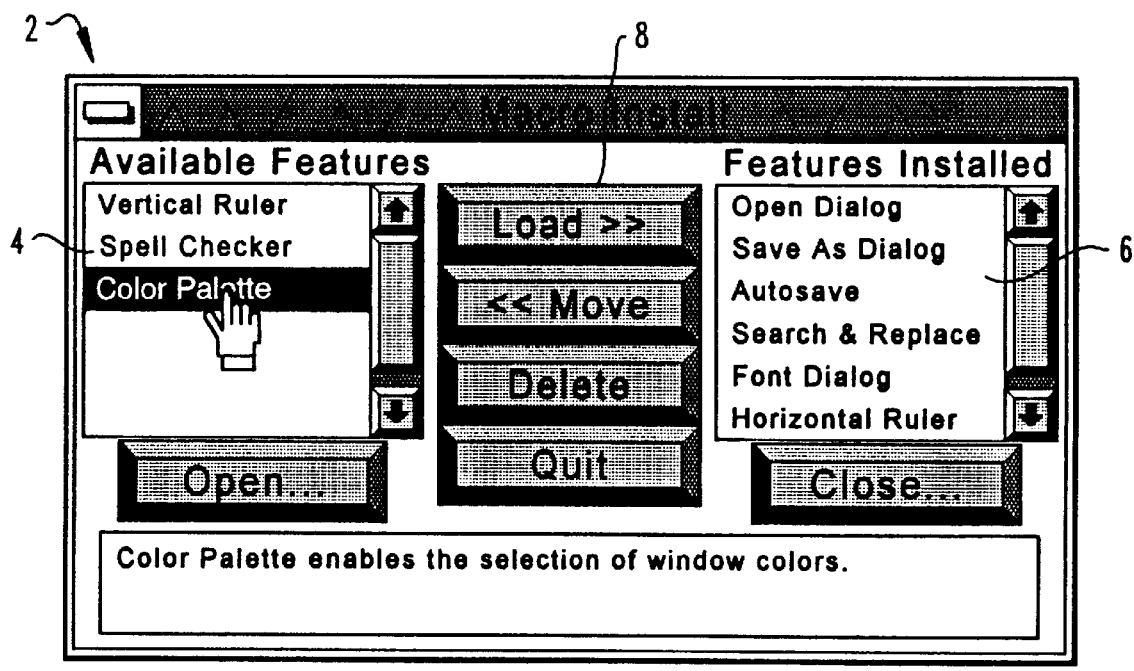
FIG. 1 depicts a prior art control panel for customizing a graphic user interface environment.
Figure 2:
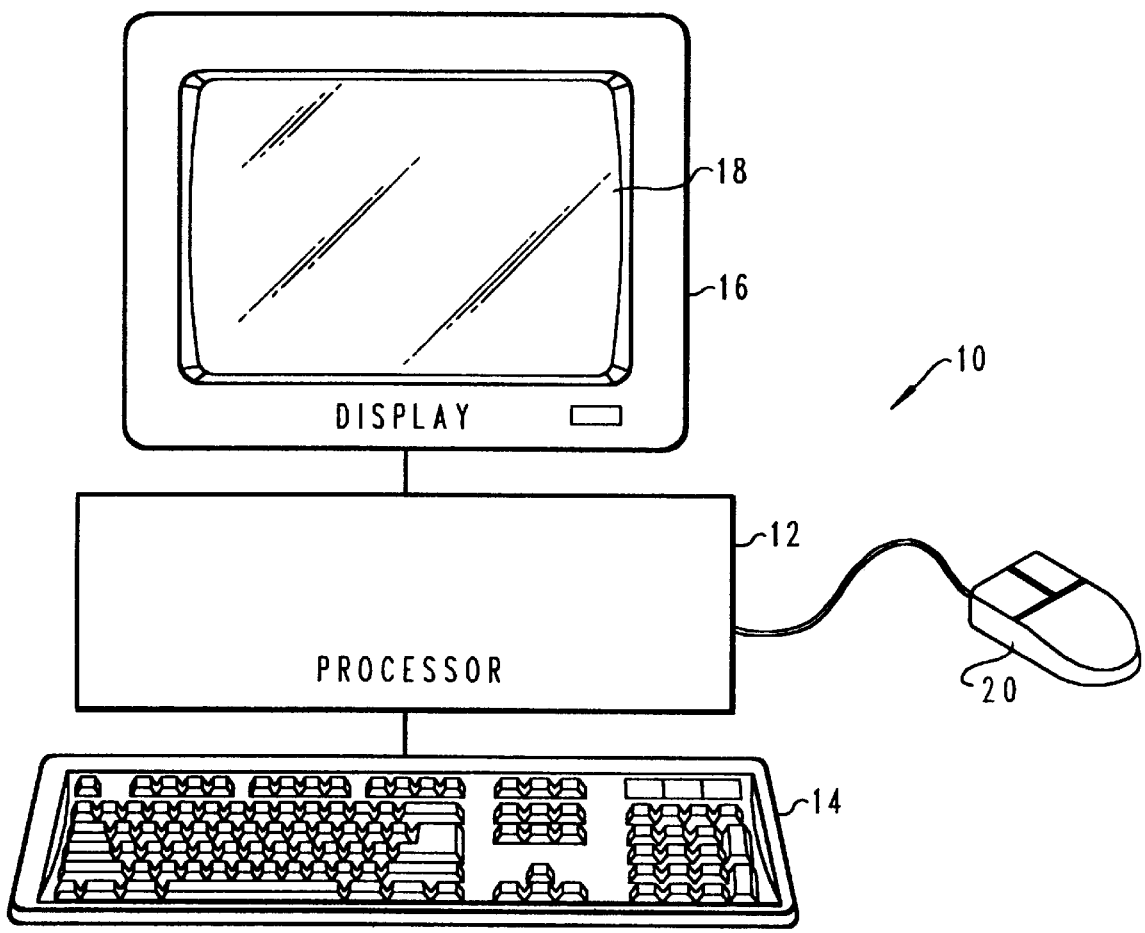
FIG. 2 is a pictorial illustration of a data processing system which may be utilized to implement a preferred embodiment of the present invention.

With reference now to the figures and in particular with reference to FIG. 2, there is depicted a pictorial representation of a data processing system 10 which may be utilized to implement the method and system of the present invention. As illustrated, data processing system 10 preferably includes a processor 12 which is coupled to a keyboard 14 and a display device 16 in a manner well known in the art. Display device 16 preferably includes a display screen 18. Those skilled in the art will appreciate that data processing system 10 may be implemented by utilizing any suitable computer including main frame computers, mini computers, so-called "personal computers," or work stations which may be coupled to a main frame host computer. One example of a data processing system which may be utilized to implement the method and system of the present invention is the International Business Machines Corporation PS/2 or RS/6000. "PS/2" and "RS/6000" are registered trademarks of International Business Machines Corporation, located in Armonk, N.Y. Data processing system 10 may also include a pointing device, such as mouse 20. Those skilled in the art should also appreciate that the hardware depicted in FIG. 1 may vary for specific applications.

Figure 3:
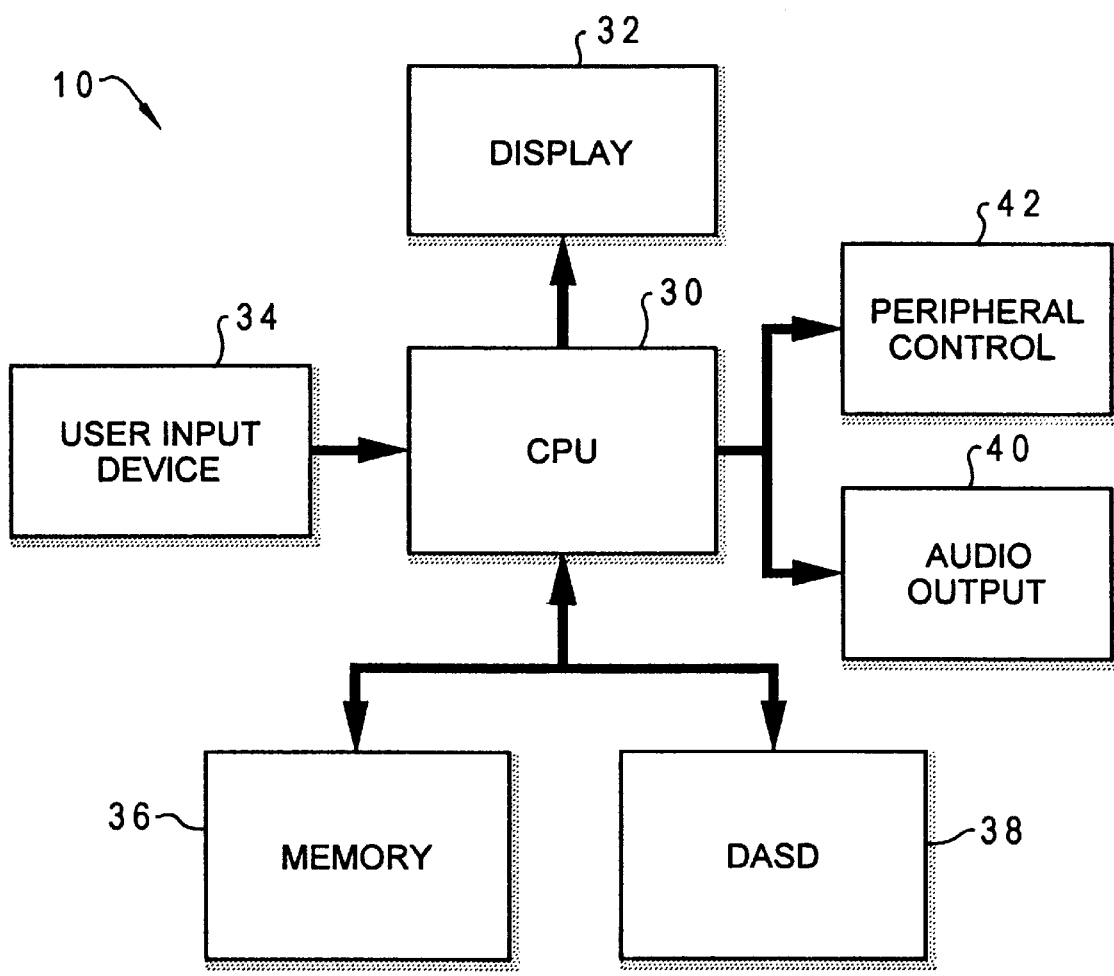
FIG. 3 depicts a more detailed high level block diagram, further illustrating the preferred data processing system of FIG. 2.

FIG. 3, depicts a more detailed high level block diagram which further illustrates the preferred data processing system 10 of FIG. 2. As illustrated, data processing system 10 is controlled primarily by software executed within central processing unit (CPU) 30. CPU 30 is coupled to display 32, and receives user input from user input device 34. CPU 30 is also coupled to memory 36 and one or more direct access storage devices (DASDs) depicted at block 38. Memory 36 and DASD 38 may be utilized for storing data sets and application programs. User input device 34 may be implemented utilizing a mouse, a touch sensitive tablet or screen, a joystick, a track ball, or a screen activated light pen. CPU 30 may also be coupled to audio output device 40 and peripheral controller 42. Audio output device 40 may include an amplifier and speaker system. Peripheral controller 42 may be utilized to control peripheral devices, such as a logic analyzer (not shown) or other electronic equipment. In the depicted embodiment of the present invention, CPU 30 is preferably suitably programmed to implement the process depicted in the flowcharts of FIGS. 5a–5c.

As is well known to those skilled in the art, a GUI environment for a data processing system is implemented with computer readable code, also known as software. The high level flowcharts of FIGS. 5a–5c which further describe the logical steps carried out by software implementing the present invention. Software program code, which employs the present invention, is typically stored in the memory of a standalone workstation environment. The software program code may be embodied on any of a variety of known media for use with a data processing system, such as a diskette or CD-ROM. The program code may be distributed on such media, or may be distributed to users from the memory of one computer system over a network of some type to other computer systems for use by users of such other systems. Such techniques and methods for embodying the software code on media and/or distributing the software code are well-known, and will not be further discussed herein.

With reference now to FIGS. 4a, 4b, 4c, and 4d, there are depicted pictorial representations of the customization of a graphic user interface environment which employs graphic manipulation of selected graphic user interface elements in accordance with the method and system of the present invention. As depicted, a window 50 is provided having a display area 52, which may be utilized to display application or system related text, graphics, icons, image data, or the like. Title bar 54 is displayed along the top of window 50, and provides a region for the display of window title 56, faceplate control icon 58, and window controls 60. Window title 56 may be utilized to designate an application name and/or an object name. An "object" is an item that can be manipulated as a unit and that a user may work with to perform a task. An object may be represented as text, image, graphic, video, or audio. For example, a text file, which may comprise a document created by a word processing application, may be considered an object.

Window controls 60 may be utilized to control the display of window 50. For example, a "maximize button" may be utilized to enlarge a window to the largest size possible for a particular view or to enlarge the size of the window to substantially fill the work place area of display screen 18. Similarly, a minimize button may be utilized to remove window 50 from the work place, and add a minimized-window visual, such as an application-defined icon, within the work place which represents the minimized window.

Faceplate control button 58 is provided and utilized during the GUI environment customization process in accordance with the method and system of the present invention as will be discussed below in greater detail.

Additionally, a menu bar 62 is provided. Those familiar with GUIs will appreciate that a command within menu bar 62 may be selected graphically, utilizing a pointing device, such as a mouse 20, or by the selection of a particular keyboard key associated with a selected command. Typically, upon user selection of a particular command within menu bar 62, a so-called "drop down" command list is provided and utilized to display individual commands which are categorized under the particular general command selected by the user from menu bar 62.

Figure 4A:
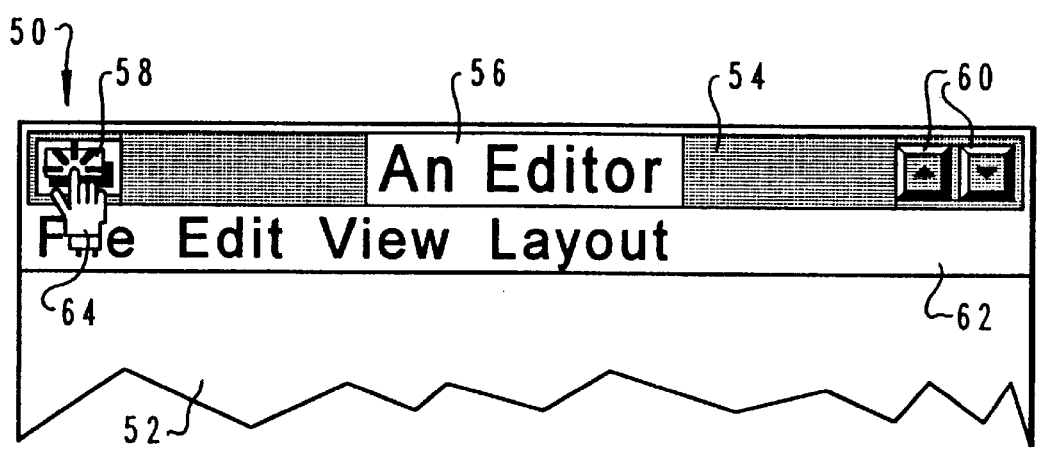
FIGS. 4a, 4b, 4c, and 4d depict pictorial representations of the method and system for customizing a graphic user interface environment that employs graphic manipulation of selected graphic user interface elements in accordance with the method and system of the present invention.

Pointer 64 is displayed on display screen 18 and is generally moved utilizing a pointing device, such as mouse 20. Pointer 64 is utilized to designate choices and objects that a user may wish to select or otherwise interact with. As depicted in FIG. 4a, pointer 64 is located overlapping faceplate control button 58. The action lines depicted above the "index finger" of pointer 64 indicate that a user has depressed (i.e., clicked) a button on mouse 20.

Figure 4B:
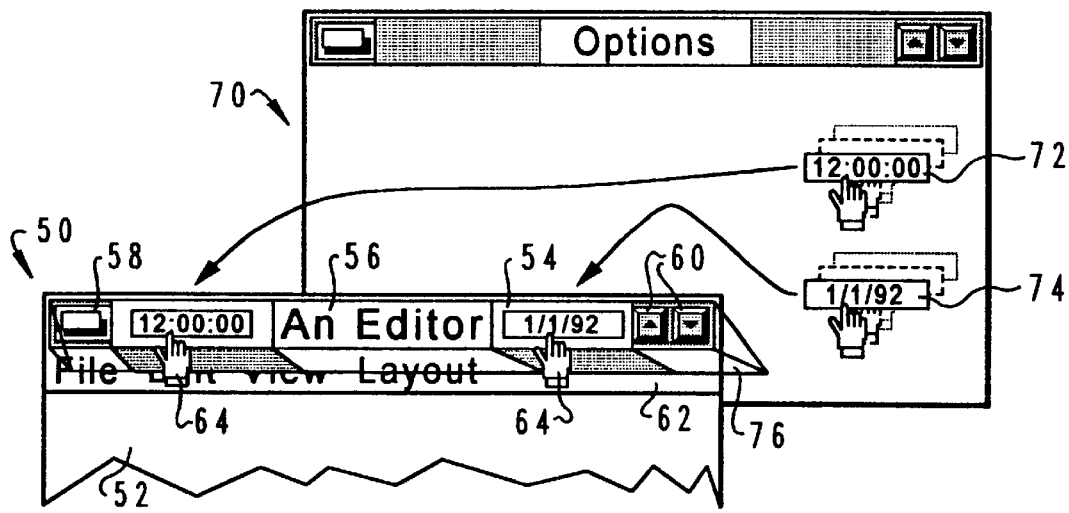

Referring now to FIG. 4b, window 50 is depicted along with window 70, which contains optional function and/or feature icons 72 and 74. Optional function and/or feature icon 72 is associated with an optional function and/or feature, which, when installed in a GUI element, displays a clock function. Optional function and/or feature icon 74 is associated with an optional function and/or feature, which, when installed in a GUI element, displays a date function.

As illustrated in FIG. 4b, window 50 is depicted with a portion of title bar 54 referred to as "faceplate" 76 illustrated in an "open" position. In this example, faceplate 76 is a graphical user interface element, which, in normal operation, occupies a region of display screen 18 that coincides with title bar 54. In FIG. 4b however, faceplate 76 has been removed or opened in response to a user selecting faceplate control button 58, as depicted previously in FIG. 4a. When faceplate 76 is open, it appears to have pivoted along the bottom edge of title bar 54 and come to rest below title bar 54, where it partially obscures menu bar 62. By opening faceplate 76, a user may thereafter place title bar 54, in a customization mode. Those persons skilled in the art should recognize that other graphic user interface elements, such as, for example, menu bar 62, other icons, or other graphic elements which comprise the GUI environment, may be susceptible to being placed in such a customization mode in accordance with the method and system of the present invention.

Those persons skilled in the art should appreciate that the process of customizing a GUI environment may comprise altering the appearance or the functionality of a particular element within a GUI environment. Alternately, it is possible to have an optional function and/or feature, which may be associated with a GUI element, which does not modify the appearance of the GUI element immediately upon installation, but rather, may alter the functionality of such GUI element during a subsequent user interaction. For example, an optional function and/or feature may be associated with window title 56 which, in response to a user selection, displays a logical location within a storage disk of the object contained in the window. If optional functions and/or features that modify the functionality of a GUI element are associated with a GUI element, the association of such an optional function and/or feature may not be apparent by viewing the GUI element with a closed faceplate, but may only be apparent by viewing an icon associated with such an optional function and/or feature, when a faceplate associated with the GUI element is "opened."

In either case, the appearance and/or functionality of a GUI element may be selectively modified by associating an optional function and/or feature with a selected GUI element by any one of several programming techniques known in the art, such as, for example, a software patch.

Once faceplate 76, which was located over the region occupied by title bar 54, has been opened, title bar 54 may be customized to display the current time and date, for example. To customize title bar 54, a user first selects an optional function and/or feature icon, such as either optional function and/or feature icon 72 or 74, which are each associated with an optional function and/or feature that will perform a desired modification on a designated GUI element. After the optional function and/or feature icon has been selected, a user may then "drag" the optional function and/or feature icon to a selected point within title bar 54, as illustrated by the bold arrows in FIG. 4b. When the optional function and/or feature icon has been dragged to a selected point within the region occupied by title bar 54, the user may "drop" the optional function and/or feature icon, thus locating a display associated with the optional function and/or feature and associating the optional function and/or feature with the selected GUI element.

Figure 4C:
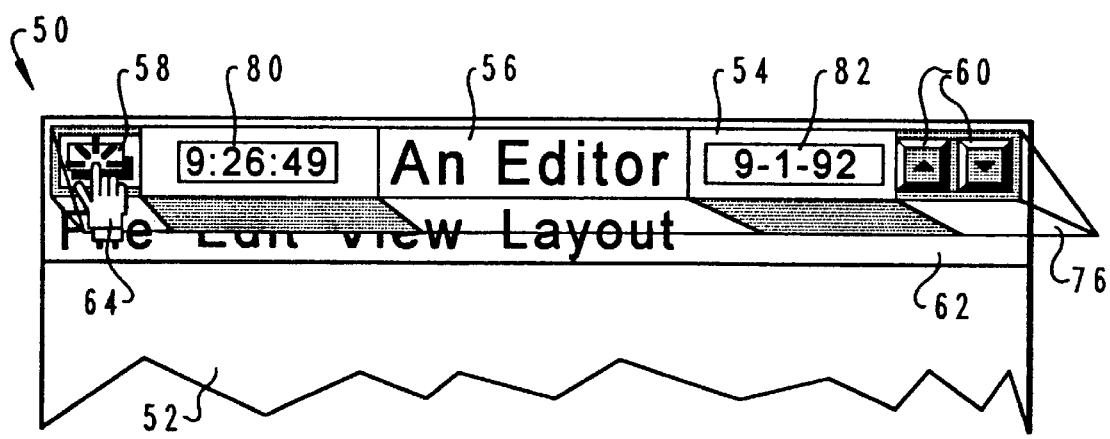

Referring now to FIG. 4c, clock display 80 and date display 82 are depicted after being located within title bar 54. As illustrated, the user has positioned pointer 64 over faceplate control button 58, and has depressed or "clicked" a button on mouse 20, closing faceplate 76. Those persons skilled in the art should appreciate that locating a display associated with an optional function and/or feature in a generally unused area of a GUI environment may increase a user's efficiency by providing desired information in a user-designated location, while minimizing the nonproductive use of work area within the GUI environment.

Figure 4D:
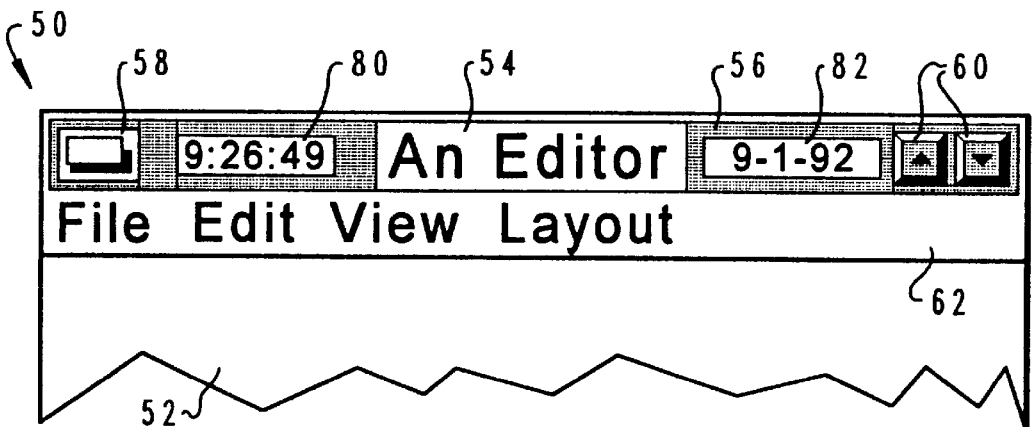

Turning now to FIG. 4d, a pictorial representation is illustrated which depicts window 50 having a customized title bar 54. Clock display 80 and date display 82, each represents an optional function and/or feature which has been installed in title bar 54.

Figure 5A:
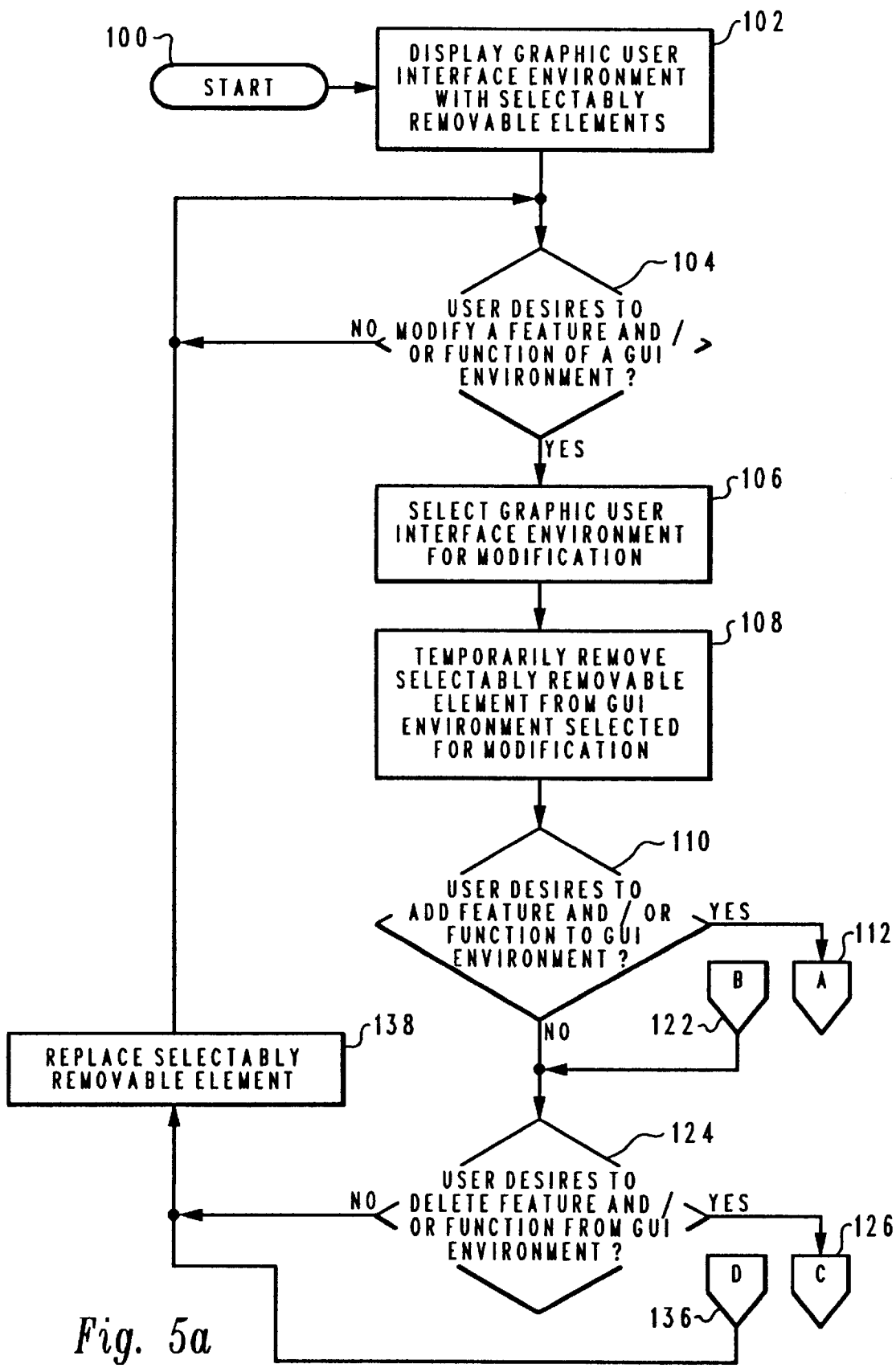
FIGS. 5a, 5b, and 5c depict a high level logic flowchart that illustrates the process of customizing a graphic user interface environment in accordance with the method and system of the present invention.
Figure 5B:
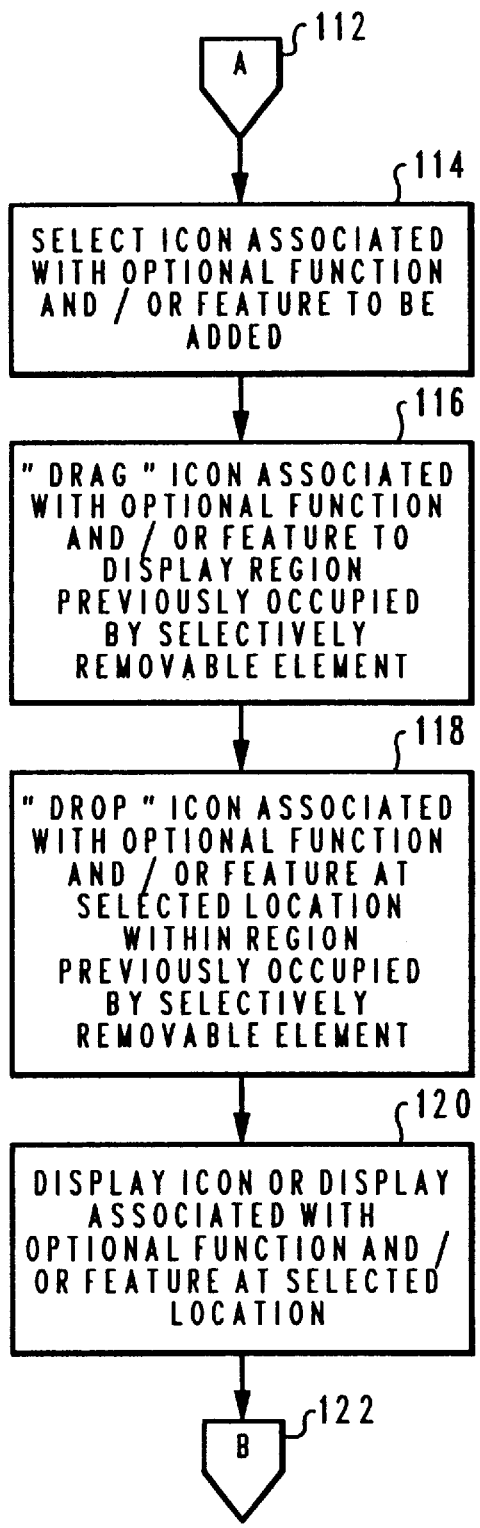
Figure 5C:
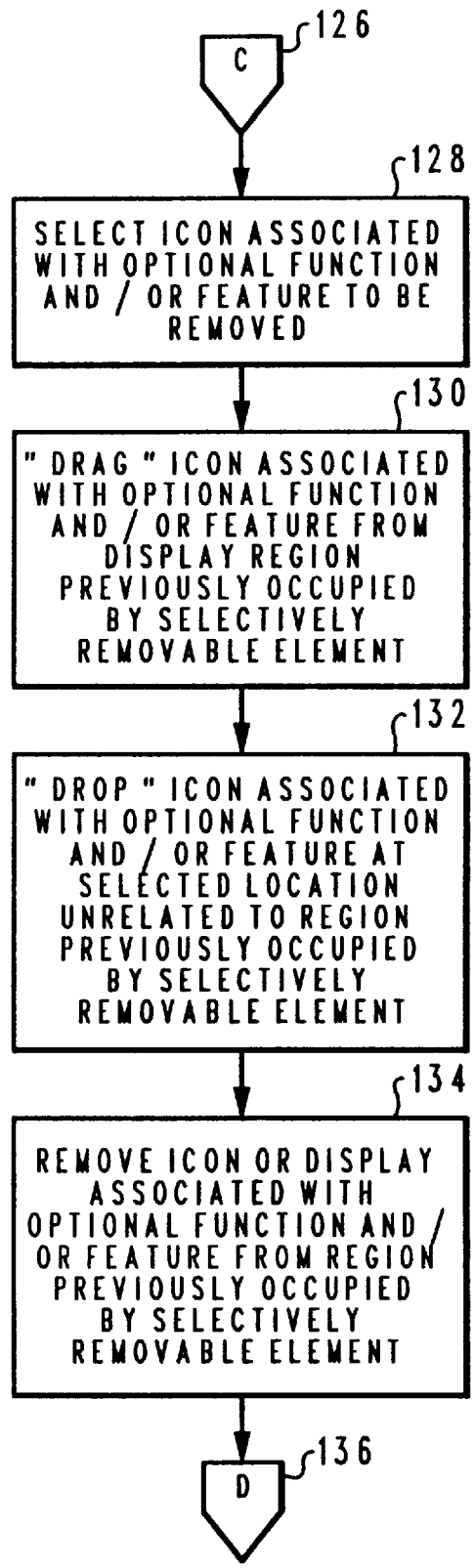

Finally, referring now to FIGS. 5a, 5b, and 5c, there are depicted high level logic flowcharts which illustrate the method and system of the present invention. As depicted, the process begins at block 100 and thereafter passes to block 102. Block 102 illustrates the display, within display screen 18, of a graphic user interface environment with selectably removable elements. One example of a selectably removable element is faceplate 76, as illustrated in FIGS. 4b and 4c. Those persons skilled in the art should recognize that selectably removable elements may be associated with any graphically distinguishable region of a GUI environment, such as for example, a title bar, a menu bar, an icon, or any other such graphic element which comprises the GUI environment.

The process next determines whether or not a user desires to modify the functions and/or features of a GUI environment, as depicted at decision block 104. If a user does not desire to modify functions and/or features, the process iterates until such time as a user desires to modify functions and/or features. Alternatively, if a user desires to modify functions and/or features of the GUI environment, a user may then select a graphic user interface environment for modification, as illustrated at block 106. Such a selection may be accomplished by graphically positioning a pointer, within a display screen, through the manipulation of a pointing device.

Next, as depicted at block 108, the process temporarily removes the selectably removable element from the GUI environment selected for modification. Those persons skilled in the art should appreciate that a selectably removable element, such as a faceplate, may be temporarily removed from a GUI environment by temporarily rendering the element transparent or by depicting such a faceplate in an open position, in much the same way as a hinged access panel would appear after being opened, and as illustrated in FIGS. 4b and 4c.

Next, as illustrated at block 110, the process determines whether or not a user desires to add a function and/or feature to the selected GUI environment. If a user desires to add functions and/or features, the process passes to block 114 of FIG. 5b, via off-page connector A, as depicted at reference numeral 112.

Referring now to FIG. 5b, a process is illustrated for adding an optional function and/or feature to a GUI environment. First, the user selects an icon associated with an optional function and/or feature to be added, as illustrated at block 114. Thereafter, a user "drags" an icon associated with the optional function and/or feature to the display region previously occupied by the selectably removable element, as depicted at block 116. Next, the user "drops" the icon associated with the optional function and/or feature at a selected location within the region previously occupied by the selectably removable element, as illustrated at block 118. After the user "drops" such an icon, the process displays the icon, or the display associated with the optional function and/or feature at the selected location, as depicted at block 120. Thereafter, the process passes to block 122 of FIG. 5a, via off-page connector B, as illustrated at reference numeral 122. Such a process of "dragging and dropping" an icon associated with an optional function and/or feature is illustrated in FIG. 4b.

Next, as illustrated at block 124, a determination is illustrated as to whether or not a user desires to delete optional functions and/or features from a GUI environment. If the user desires to delete optional functions and/or features from the GUI environment, the process passes, via off-page connector C, as illustrated at reference numeral 126, to block 128 of FIG. 5c. As illustrated at block 128 in FIG. 5c, the user selects an icon, within the region previously occupied by the selectably removable element, which is associated with an optional function and/or feature to be removed. Thereafter, the user "drags" the icon associated with the optional function and or feature from the display region previously occupied by the selectably removable element, as depicted at block 130. Next, the user "drops" the icon associated with the optional function and/or feature at a selected location that is unrelated to the region previously occupied by the selectably removable element, as illustrated at block 132. The process then removes the icon, or display associated with the optional function and/or feature, from the region previously occupied by the selectably removable element, as depicted at block 134. Thereafter, the process passes, via off-page connector D, as depicted at reference numeral 136, to block 138 of FIG. 5a.

As illustrated at block 138 in FIG. 5a, the user then replaces the selectably removable element at the position originally occupied by the selectably removable element. Thereafter, the above-described process continues in an iterative fashion.

After reading the detailed description of the preferred embodiment above, it should be apparent to those persons skilled in the applicable art that the present disclosure provides an improved method and system for graphically modifying functions and/or features in a graphical user interface environment. In a preferred embodiment, a user may select and place a GUI element in a customization mode by opening a faceplate, and thereafter select, "drag," and "drop" an icon associated with an optional function and/or feature into an area within the region occupied by the selected GUI element in order to add optional functions and/or features to the GUI environment. One example of adding such an optional function and/or feature is the installation of a clock or calendar display within unused areas of a window title bar. Moreover, such installation of optional functions and/or features may alter the functionality of any graphically distinguishable region of a GUI environment. Thus, a preferred embodiment of the present invention provides an improved method and system for modifying functions and/or features of a graphic user interface environment utilizing graphic manipulation of selected graphic user interface elements to initiate the installation of optional functions and/or features.

While the invention has been particularly shown and described with reference to a preferred embodiment, it will be understood by those skilled in the art that various changes in form and detail may be made therein without departing from the spirit and scope of the invention.

What is claimed is:

1. A method in a data processing system having a display for graphically modifying functions and/or features of a graphical user interface having at least one graphical user interface element associated therewith, said method comprising the steps of:

displaying a graphical user interface element within a window within said display;

temporarily removing said graphical user interface element from said window in preparation for modifying an area of said window coextensive with said graphical user interface element;

designating a selected area within the coextensive area within said window;

displaying a user-selected representation of a desired function and/or feature within said selected area within said window in response to said designation of said selected area;

restoring said graphical user interface element to said window; and thereafter displaying said user-selected representation within said selected area within said graphical user interface element of said window whenever said window is open, wherein a user may graphically modify functions and/or features associated with said graphical user interface.

2. The method in a data processing system for graphically modifying functions and/or features of a graphical user interface according to claim 1, wherein the step of temporarily removing said graphical user interface element from said window further comprises the step of temporarily displaying said graphical user interface element in a region within said display.

3. The method in a data processing system for graphically modifying functions and/or features of a graphical user interface according to claim 2, wherein the step of temporarily displaying said graphical user interface element in a region within said display further comprises the step of temporarily displaying said graphical user interface element in a region having a common boundary with said window.

4. The method in a data processing system for graphically modifying functions and/or features of a graphical user interface according to claim 1, wherein said window includes a plurality of selected areas, and wherein said step of displaying a user-selected representation of a desired function and/or feature within said selected area within said window in response to said designating of said selected area further comprises the step of displaying a plurality of user-selected representations of a plurality of desired functions and/or features within said plurality of selected areas.

5. The method in a data processing system for graphically modifying functions and/or features of a graphical user interface according to claim 1, wherein said step of displaying said user-selected representation within said selected area within said graphical user interface element further comprises the step of displaying a time display.

6. The method in a data processing system for graphically modifying functions and/or features of a graphical user interface according to claim 1, wherein said step of displaying said user-selected representation within said selected area within said graphical user interface element further comprises the step of displaying a date display.

7. A data processing system having a display for graphically modifying functions and/or features of a graphical user interface having at least one graphical user interface element associated therewith by modifying structure of the graphical user interface element so that the modified graphical user interface element is displayed thereafter, said data processing system comprising:

means for displaying a graphical user interface element within a first region within said display;

means for temporarily removing said graphical user interface element from said first region in preparation for modifying an area of said first region co-extensive with said graphical user interface element;

means for designating a selected area within the co-extensive area within said first region;

means for displaying a user-selected representation of a desired function and/or feature within said selected area within said first region in response to a designation of said selected area;

means for restoring said graphical user interface element to said first region; and means for displaying said user-selected representation within said selected area within said graphical user interface element whenever said graphical user interface element is displayed, wherein a user may graphically modify functions and/or features associated with said graphical user interface.

8. The data processing system for graphically modifying functions and/or features of a graphical user interface according to claim 7, wherein said means for temporarily removing said graphical user interface element from said first region further comprises means for temporarily displaying said graphical user interface element in a second region within said display.

9. The processing system for graphically modifying functions and/or features of a graphical user interface according to claim 8, wherein said means for temporarily displaying said graphical user interface element in a second region within said display further comprises means for temporarily displaying said graphical user interface element in a second region having a common boundary with said first region.

10. The data processing system for graphically modifying functions and/or features of a graphical user interface according to claim 7, wherein said first region includes a plurality of selected areas, and wherein said means for displaying a user-selected representation of a desired function and/or feature within said selected area within said first region in response to a designation of said selected area further comprises means for displaying a plurality of user-selected representations of a plurality of desired functions and/or features within said plurality of selected areas.

11. The data processing system for graphically modifying functions and/or features of a graphical user interface according to claim 7, wherein said means for displaying said user-selected representation within said selected area within said graphical user interface element further comprises means for displaying a time display.

12. The data processing system for graphically modifying functions and/or features of a graphical user interface according to claim 7, wherein said means for displaying said user-selected representation within said selected area within said graphical user interface element further comprises means for displaying a date display.

13. The data processing system for graphically modifying functions and/or features of a graphical user interface according to claim 7, wherein said first region is a window.

14. Computer readable code for permitting a user to customize a structural non-content portion of an element of a graphical user interface by adding an optional function/feature to, or deleting an optional function/feature from, the portion of the element, comprising:

first subprocesses for permitting a user to select a portion of an element of a graphical user interface for customization;

second subprocesses for permitting the user to select a first function/feature to be added to the portion of the element from a set of optional features/functions;

third subprocesses for permitting the user to place the selected function/feature at a user desired portion for display within the portion of the element; and fourth subprocesses for permitting the user to delete a second function/feature from the portion of the element upon designation of the second function/feature;

wherein said first subprocesses further remove the portion from the element upon selection of the portion and wherein said third subprocesses and said fourth subprocesses are carried out while the portion is removed, said computer readable code further comprising filth subprocesses for restoring the portion to the element after the user has added the first function/feature and/or deleted the second function/feature.

15. Computer readable code for permitting a user to customize a structural non-content portion of an element of a graphical user interface according to claim 14, wherein said first subprocesses further display the portion of the element at a new location within the graphical user interface upon selection of the portion, and wherein said fifth subprocesses further restore the portion from the new location to the element.

16. Computer readable code for permitting a user to customize a structural non-content portion of an element of a graphical user interface by adding an optional function/feature to, or deleting an optional function/feature from, the portion of the element, comprising:

first subprocesses for permitting a user to select a portion of an element of a graphical user interface for customization;

second subprocesses for permitting the user to select a first function/feature to be added to the portion of the element from a set of optional features/functions;

third subprocesses for permitting the user to place the selected function/feature at a user desired portion for display within the portion of the element; and fourth subprocesses for permitting the user to delete a second function/feature from the portion of the element upon designation of the second function/feature;

further comprising sixth subprocesses for providing a user manipulable button within the portion, selection of which by the user permits the user access to said first, second, third and fourth subprocesses to cause processing to be performed.

17. Computer readable code for permitting a user to customize a structural non-content portion of an element of a graphical user interface according to claim 15, wherein said first subprocesses further provide a user manipulable button, selection of which by the user causes a portion of the element to be displayed at the new location when the portion is located in the element, and wherein said fifth subprocesses restore the element from the new location to the element upon selection of the user manipulable button when the portion is in the new location.

* * * * *